United States Patent Office 2,954,407
Patented Sept. 27, 1960

2,954,407

PROCESS FOR CONVERTING ARYL CARBOXYLIC ACIDS TO PHENOLS

William H. Taplin III, Concord, Calif., assignor to The Dow Chemical Company, Midland, Mich., a corporation of Delaware No Drawing. Filed Oct. 21, 1957, Ser. No. 691,118

3 Claims. (Cl. 260—621)

This invention relates to improved processes for making phenolic compounds from aryl carboxy compounds by the catalytic oxidation and decarboxylation of the latter. More specifically, it relates to processes for separating the by-product tars from the reaction mixture of such processes.

It is known to convert aryl carboxylic acids or their anhydrides, salts, esters, and the like, to phenols by the catalytic oxidation and decarboxylation of the carboxy compounds. Such processes are illustrated, for instance, in U.S. Patent 2,727,926. In such processes considerable difficulty and loss of materials has been encountered because of the formation and accumulation in the reactor of a tar-like by-product. If this tar is simply removed and discarded, a considerable loss of carboxy and phenolic compounds and of the metallic salts used as catalysts is suffered.

According to the invention, the by-product tar is separated and discarded without serious loss of desirable materials by intimately contacting the tar with liquid water at about 100–175° C. before discarding it. Water at the specified temperature readily dissolves the carboxy and phenolic compounds as well as the copper, magnesium or other salts of the aromatic acids and phenols present in the reaction mixture. The water in the aqueous extract obtained from the tar-removal step may be partially or wholly separated from the extract before the materials dissolved therein are returned to the reactor. In a preferred mode of operation, however, the aqueous extract is returned to the reactor without being concentrated, the water contained therein, being useful in the reactor to provide steam to distill the phenolic products from the reactor.

The practice of the invention is illustrated by the following examples.

*Example 1*

An upright, cylindrical reactor was charged with 201 g. of benzoic acid, 17.5 g. of copper benzoate and 6.7 g. of magnesium oxide. The charge was heated to 230° C., at which temperature the entire charge was a homogeneous liquid.

Air at the rate of 500 ml. per minute and water at the rate of 1 ml. per minute were injected into the charge near the bottom of the reactor, agitation being provided by a mechanical stirrer in addition to that resulting from the air stream and the steam generated from the water being added. The gases and volatile products passed out of the reactor to a condenser system.

The condensate consisted predominantly of phenol and water, with small amounts of benzene and benzoic acid. These components were separated and the benzoic acid was returned to the reactor.

About every half hour, 10 g. of fresh benzoic acid was added to the reaction mixture and every 3 hr. a 20 g. portion of the mixture was withdrawn for removal of tar.

The tar was separated from the desired components of the withdrawn portion by mixing the material with an equal volume of water and agitating the resulting mixture for one half hour in a closed vessel at a temperature of 150 °C. In this way, substantially all the phenol, benzoic acid and benzoate salts were dissolved in the aqueous phase. This phase was then separated from the tar phase and returned to the reactor as part of the water fed thereto.

The reactor was thus operated in a continuous manner for 110 hr., during which time 1955 g. of benzoic acid were added to the reactor, in addition to the 201 g. put in initially. During this period, 1220 g. of phenol and 14.3 g. of benzene were collected in the distillate, which, based on the 1955 g. of benzoic acid consumed, amounted to conversions of 90 mol percent and 1 mol percent, respectively. The charge in the reactor at the end of the run was fully active and the amount of tar therein was stabilized at a low, substantially harmless level.

When the reactor was operated as described above except that no tar was removed, it gradually became filled with tar and operation had to be stopped so the reactor could be cleaned. Conversion of benzoic acid to phenol by this intermittent operation was low, because of the large loss of benzoic acid and salts in the tar.

When the reactor was operated as described above except that the portions of reactor contents withdrawn every 3 hr. were discarded without any attempt to recover the benzoic acid or salts therein, the reactor gradually became depleted of catalyst and the conversion rate fell accordingly until it reached an impractically low point. The normal rate of reaction could be restored by the intermittent addition of fresh catalyst to make up for that lost in the tar. Even then, the percentage of benzoic acid converted to phenol was low because of the losses of benzoic acid and salts in the discarded tar.

*Example 2*

The experiment of Example 1 was repeated except that the portions of reactor contents withdrawn for separation of tar were extracted with water at 123° C. instead of at 150° C. Analysis showed that 88% of the benzoic acid and 66% of the benzoate salts were dissolved in the aqueous phase and thus recovered from the tar phase.

*Example 3*

The experiment of Example 1 was repeated except that the portions of reactor contents withdrawn for tar removal were each extracted three times with five times their weight of water at 140° C. instead of once at 150° C. There were thus recovered 90% of the benzoic acid and 74% of the benzoate salts therein.

The benzoic acid and benzoate salts in the reaction mixture and tar are readily dissolved in hot water at up to 175° C., though there is slight advantage in the use of temperatures above about 150°. One disadvantage of such higher temperatures is the correspondingly higher pressures that are attained, thus requiring heavier and more expensive equipment. Conversely, lower temperatures may be used, even as low as 100°. An obvious advantage of the latter temperature is that the extraction step may be conducted at atmospheric pressure. This advantage is more than balanced, however, by the fact that the benzoic acid and salts are much less soluble, and hence, their extraction from the tar is slower, more tedious and less complete.

While the amount of water used in extracting the benzoic acid and salts from the tar is not critical, best results are usually obtained when 0.5 to 5 parts, by weight of water per part of reaction mixture are used. A smaller proportion of water is insufficient to effectively extract the desired materials while a larger proportion, unless used for multiple or counter-current extraction, may likewise not dissolve all the desired components. This seemingly paradoxical result apparently stems from the fact that some of the components extracted by the water solubilize others. Probably there is sufficient phenol or phenyl benzoate present to solubilize the benzoic acid and salts, at least at the temperatures used.

While the above examples describe the batchwise or intermittent operation of the process of the invention, a preferred manner of operating on a commercial scale includes operating the reactor on a continuous basis, a portion of the reactor contents being continuously withdrawn from the reactor and extracted with hot water in a continuous, counter-current manner, the aqueous extract being recycled to the reactor and the residual tar discarded.

Results similar to those described above are obtained when substituted benzoic acids having substituent groups that are inert in the oxidation reaction are used instead of benzoic acid itself. Such substituents include alkyl, phenyl, chloro bromo and nitro radicals and combinations thereof. In short, the process of the invention is operable and advantageous in the oxidation of any aromatic monocarboxylic acid that can be catalytically air-oxidized to the corresponding phenolic compound.

I claim:

1. In a process for converting an aryl monocarboxy compound to the corresponding aryl hydroxy compound by forming a reaction mixture comprising the aryl monocarboxy compound and a copper salt soluble in the reaction mixture and heating said reaction mixture in a reaction zone in the presence of oxygen and water at a temperature at which carbon dioxide is evolved, the step comprising withdrawing at least an aliquot portion of the reaction mixture from the reaction zone and intimately contacting it with about from 0.5 to 5 times its weight of liquid water while at a temperature of about 100–175° C., separating the resulting aqueous phase from the non-aqueous phase and returning the former to the reaction zone.

2. A process as defined in claim 1 wherein at least a portion of the reaction mixture is continuously withdrawn from the reaction zone, mixed with about 0.5 to 5 times its weight of water, heated to about 100 to 175° C. while under sufficient pressure to maintain a liquid aqueous phase and said phase is continuously separated from the non-aqueous phase and returned to the reactor.

3. A process as defined in claim 1 wherein the aryl monocarboxy compound is benzoic acid and the aryl hydroxy compound is phenol.

References Cited in the file of this patent

UNITED STATES PATENTS

| | | |
|---|---|---|
| 2,727,926 | Kaeding et al. | Dec. 20, 1955 |
| 2,852,567 | Barnard et al. | Sept. 16, 1958 |